United States Patent
Hirata et al.

(10) Patent No.: US 10,264,227 B2
(45) Date of Patent: Apr. 16, 2019

(54) PROJECTION-TYPE IMAGE DISPLAY DEVICE

(71) Applicant: Maxell, Ltd., Kyoto (JP)

(72) Inventors: Koji Hirata, Ibaraki (JP); Tatsuya Ishikawa, Ibaraki (JP); Yuki Nagano, Ibaraki (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/307,110

(22) PCT Filed: May 9, 2014

(86) PCT No.: PCT/JP2014/062485
§ 371 (c)(1),
(2) Date: Oct. 27, 2016

(87) PCT Pub. No.: WO2015/170405
PCT Pub. Date: Nov. 12, 2015

(65) Prior Publication Data
US 2017/0048503 A1     Feb. 16, 2017

(51) Int. Cl.
*H04N 9/30* (2006.01)
*H04N 9/31* (2006.01)
(Continued)

(52) U.S. Cl.
CPC .......... *H04N 9/3144* (2013.01); *G03B 21/16* (2013.01); *G03B 21/2033* (2013.01);
(Continued)

(58) Field of Classification Search
CPC .......................... H04N 5/7441; H04N 9/3144
(Continued)

(56) References Cited

U.S. PATENT DOCUMENTS

2005/0201107 A1    9/2005  Seki
2007/0103646 A1*   5/2007  Young ................. G01J 1/32
                                                  353/52
(Continued)

FOREIGN PATENT DOCUMENTS

JP    2003-110264 A    4/2003
JP    2005-257873 A    9/2005
(Continued)

OTHER PUBLICATIONS

International Search Report of PCT/JP2014/062485 dated Aug. 12, 2014.

*Primary Examiner* — Jefferey F Harold
*Assistant Examiner* — Sihar A Karwan
(74) *Attorney, Agent, or Firm* — Mattingly & Malur, PC

(57) ABSTRACT

A projection-type image display device includes: a light source unit that irradiates video light to be magnified and projected onto a reflection mirror; a video processing unit that generates the video light to be magnified and projected on the basis of an external electrical signal and light irradiated from the light source unit; and a projection-type optical system that magnifies and projects the video light output from the video processing unit, wherein the light source unit includes a red (R) solid-state light source, a green (G) solid-state light source, and a blue (B) solid-state light source each of which is configured as at least a solid-state light emitting device and each solid-state light source is provided with a cooling member, and wherein driving power input to each solid-state light source is controlled on the basis of light emission characteristics or the state of the cooling member.

7 Claims, 9 Drawing Sheets

(51) Int. Cl.
  *G03B 21/16* (2006.01)
  *G03B 21/20* (2006.01)
  *G03B 33/06* (2006.01)

(52) U.S. Cl.
  CPC ......... *G03B 21/2053* (2013.01); *G03B 33/06* (2013.01); *H04N 9/30* (2013.01); *H04N 9/3155* (2013.01); *H04N 9/3158* (2013.01); *H04N 9/3164* (2013.01)

(58) Field of Classification Search
  USPC ........................................................ 348/748
  See application file for complete search history.

(56) References Cited

U.S. PATENT DOCUMENTS

| | | |
|---|---|---|
| 2007/0291236 A1 | 12/2007 | Hirata et al. |
| 2008/0204673 A1 | 8/2008 | Hirata et al. |
| 2009/0086169 A1 | 4/2009 | Nakamura |
| 2010/0073642 A1 | 3/2010 | Sueoka |
| 2011/0128509 A1 | 6/2011 | Narikawa |
| 2012/0249976 A1 | 10/2012 | Shibasaki et al. |
| 2013/0070208 A1 | 3/2013 | Nakanishi |
| 2013/0070453 A1 | 3/2013 | Chiba et al. |
| 2015/0009218 A1 | 1/2015 | Fukutomi et al. |
| 2017/0192528 A1* | 7/2017 | Naess ................. G06F 3/017 |

FOREIGN PATENT DOCUMENTS

| | | |
|---|---|---|
| JP | 2007-024939 A | 2/2007 |
| JP | 2007-109747 A | 4/2007 |
| JP | 2009-86271 A | 4/2009 |
| JP | 2010-056219 A | 3/2010 |
| JP | 2011-113874 A | 6/2011 |
| JP | 2012-124345 A | 6/2012 |
| JP | 2012-215846 A | 11/2012 |
| JP | 2012-215909 A | 11/2012 |
| JP | 2013-008044 A | 1/2013 |
| JP | 2013-073076 A | 4/2013 |
| JP | 2013-123099 A | 6/2013 |
| JP | 2013-213876 A | 10/2013 |
| JP | 2014-021287 A | 2/2014 |
| WO | 2011/148507 A1 | 12/2011 |
| WO | 2011/152217 A1 | 12/2011 |

* cited by examiner

| INSTALLATION STATE | RGB OUTPUT RATIO | REMARK |
|---|---|---|
| HORIZONAL INSTALLATION | R:G:B=1:1:1 | |
| HORIZONTAL LEFTWARD INCLINED INSTALLATION | R:G:B=0.98:1:1 | |
| HORIZONTAL RIGHTWARD INCLINED INSTALLATION | R:G:B=··· | |
| PERPENDICULAR INSTALLATION | ··· | |
| PERPENDICULAR LEFTWARD INCLINED INSTALLATION | ··· | |
| PERPENDICULAR RIGHTWARD INCLINED INSTALLATION | ··· | |

PROJECTION-TYPE IMAGE DISPLAY DEVICE

TECHNICAL FIELD

The present invention relates to a projection-type image display device.

BACKGROUND ART

A projection-type image display device is applied to a large-size projection television. Further, as disclosed in, for example, Patent Document 1 below, the projection-type image display device is also used as a device that receives a video signal from the outside and magnifies and projects the video to a panel or a wall surface. Further, in recent years, the projection-type image display device is not limited to a device that displays a video signal from a PC (Personal Computer), but is also expected as a device that simply projects a video obtained from a portable terminal such as iPhone or iPad mini to a wall surface or a desk surface. As a configuration thereof, a detailed configuration of a projection-type lens system including a reflection mirror (a free curve mirror) or a free curved lens is known in Patent Document 2 below.

CITATION LIST

Patent Document

Patent Document 1: JP 2013-8044 A
Patent Document 2: JP 2012-215909 A

SUMMARY OF THE INVENTION

Problems to be Solved by the Invention

However, according to the above-described projection-type image display device, a posture (an installation state) also changes depending on a use situation particularly in a projector that projects a video while being connected to a portable terminal or a PC.

Meanwhile, the projection-type image display device frequently employs a solid-state light source configured as a semiconductor light emitting element such as an LED or a laser element having excellent light conversion efficiency, durability, or handleability instead of a conventional high-pressure mercury lamp.

As will be described later, it is particularly important to efficiently release heat generated from the solid-state light source to the outside in order to sufficiently exhibit the performance of the projection-type image display device. For example, an efficient cooling operation using a heat pipe or the like is performed.

Here, the invention is made in view of the above-described problems of the related art and an object of the invention is to provide a projection-type image display device of which a posture (an installation state) changes variously depending on a situation particularly as in a projector that projects a video while being connected to a portable terminal or a PC. Particularly, a cooling structure of a solid-state light source is provided.

Solutions to Problems

In order to attain the above-described object, according to the invention, provided is a projection-type image display device including: a light source unit that irradiates video light to be magnified and projected onto a reflection mirror; a video processing unit that generates the video light to be magnified and projected on the basis of an external electrical signal and light irradiated from the light source unit; and a projection-type optical system that magnifies and projects the video light output from the video processing unit, wherein the light source unit includes a red (R) solid-state light source, a green (G) solid-state light source, and a blue (B) solid-state light source each of which is configured as at least a solid-state light emitting device and each solid-state light source is provided with a cooling member, and wherein driving power input to each solid-state light source is controlled on the basis of light emission characteristics or the state of the cooling member.

Effects of the Invention

According to the invention, it is possible to provide a projection-type image display device which can be excellently used for a practical purpose and exhibit optimal light emission characteristics in accordance with a posture (an installation state) regardless of light emission characteristics of different solid-state light sources.

MODE FOR CARRYING OUT THE INVENTION

Hereinafter, a projection-type image display device according to an embodiment of the invention will be described in detail with reference to the drawings.

Figure 1:
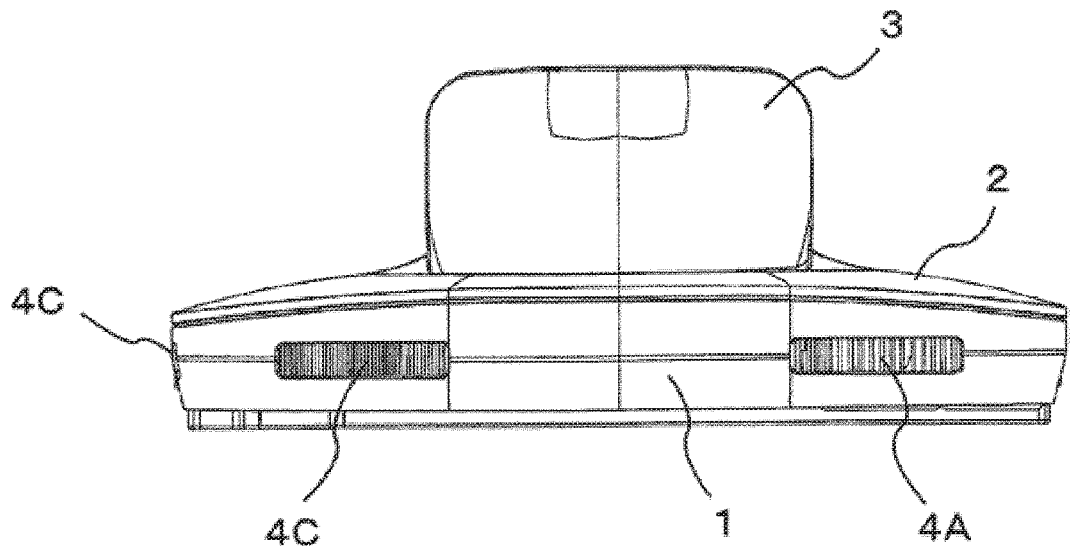
FIG. 1 is a diagram showing a front appearance of a projection-type image display device.

First, FIG. 1 is a front view showing an appearance of the projection-type image display device. Here, Reference Sign 1 of the drawing indicates a lower casing of the device, Reference Sign 2 indicates an upper casing, Reference Sign 3 indicates an openable mirror cover formed on an upper face of the upper casing, and Reference Sign 4 indicates an exhaust port formed at a side face of the lower casing to discharge heat generated inside the device to the outside (precisely, a sirocco fan and an axial fan are provided inside the device, "C" is added to the last of the reference sign of the exhaust port of air of the sirocco fan and "A" is added to the last of the reference sign of the exhaust port of air of the axial fan). Further, a casing having a substantially box shape is formed by the lower casing 1 and the upper casing 2. This appearance is designed in consideration of a use state of the device. For example, the device can be used while standing on a surface of a desk or a table (so that a video is projected onto the surface of the desk or the table). Here, the device can stand uprightly while a rear face is used as a bottom face. In addition, a member such as a stand which is attachable to or detachable from the casing or is built inside the casing to be taken out may be provided.

Figure 2:
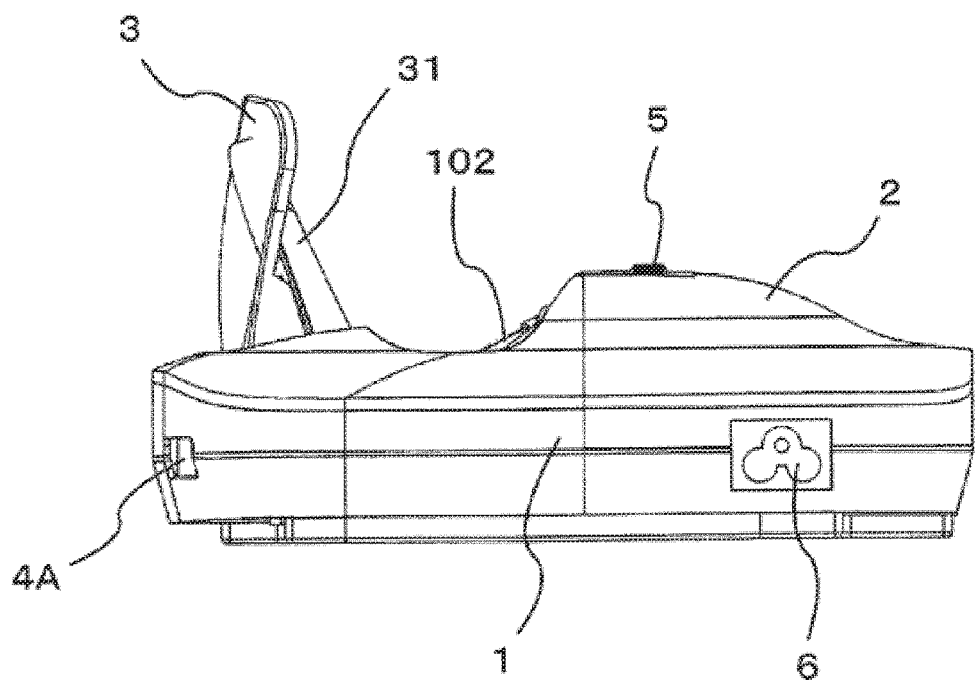
FIG. 2 is a diagram showing a right appearance of the projection-type image display device.

FIG. 2 is a side view showing the projection-type image display device. A reflection mirror (a free curve mirror) 31 which is formed in a convex shape in a rotationally asymmetrical state is attached into the openable mirror cover 3 attached onto the upper face of the upper casing, a lens optical system 102 to be described later is disposed inside a convex portion formed at the substantial center (see FIG. 1) of a front face of the upper casing, and an opening is formed at that position to guide a projected light to the outside (in the drawing, only a part of the lens optical system 102 is shown through the opening). Further, Reference Sign 5 of the drawing indicates a part (an upper end protruding outward from the upper casing) of a so-called focus adjustment dial for adjusting a focus state of a projected video by changing a lens position using a lens adjustment mechanism. Additionally, Reference Sign 6 of the drawing indicates a so-called power inlet for supplying required power (commercial power) to a light source or a control device and the power inlet is provided at the side face (a power source unit installation side) of the lower casing 1.

Figure 3:
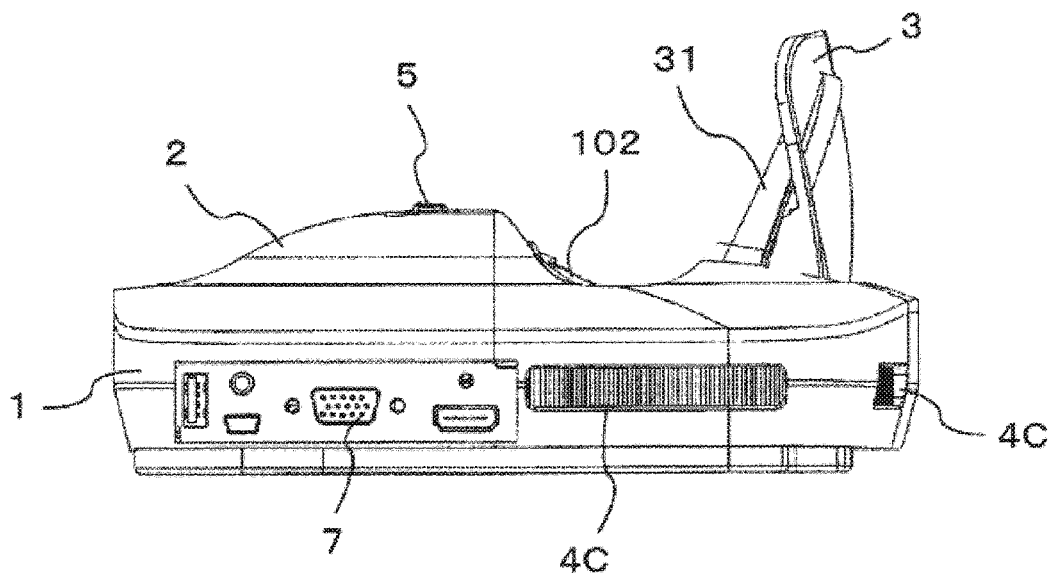
FIG. 3 is a diagram showing a left appearance of the projection-type image display device.

FIG. 3 is a side view showing the projection-type image display device when viewed from the opposite side to FIG. 2. Here, the side face (an LED illumination unit installation side) of the lower casing 1 is provided with a terminal board 7 having various terminals for inputting a video signal from an external device (for example, a portable terminal or a PC) along with the exhaust port 4. Further, the exhaust port 4 shown at the substantial center of the drawing indicates an exhaust port through which air is discharged from the sirocco fan for cooling an electric circuit mounted into the device, that is, a driving board of an LED or an image processing device or a control unit (for example, a CPU) controlling the operation of the entire device including these components.

<Inner Structure>

Next, an inner structure of the projection-type image display device will be described in detail below with reference to FIGS. 4 to 8.

Figure 4:
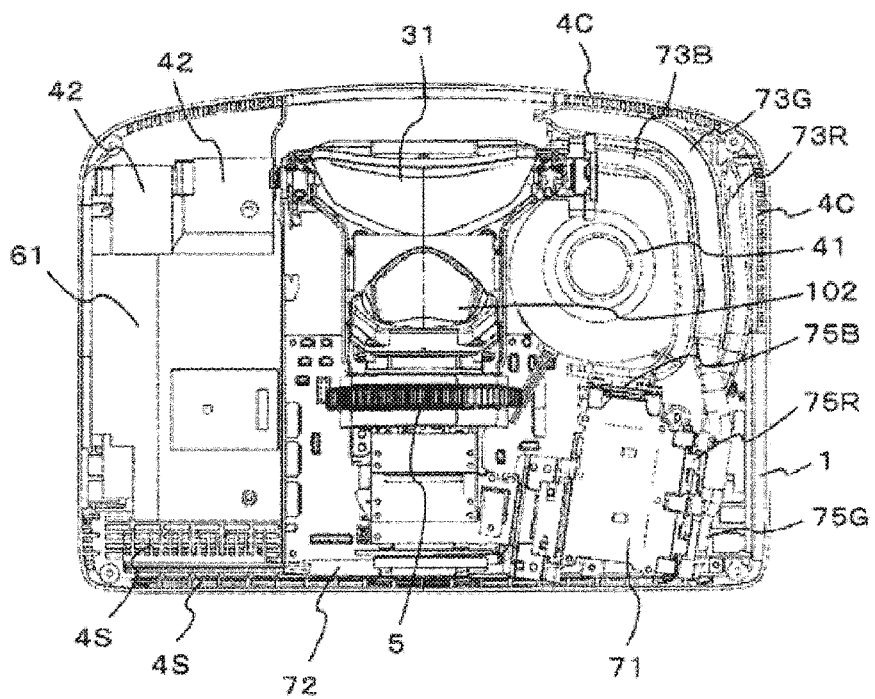
FIG. 4 is a top view showing a detailed structure of a casing inner part of the projection-type image display device in a state where an upper casing is removed.
Figure 5:
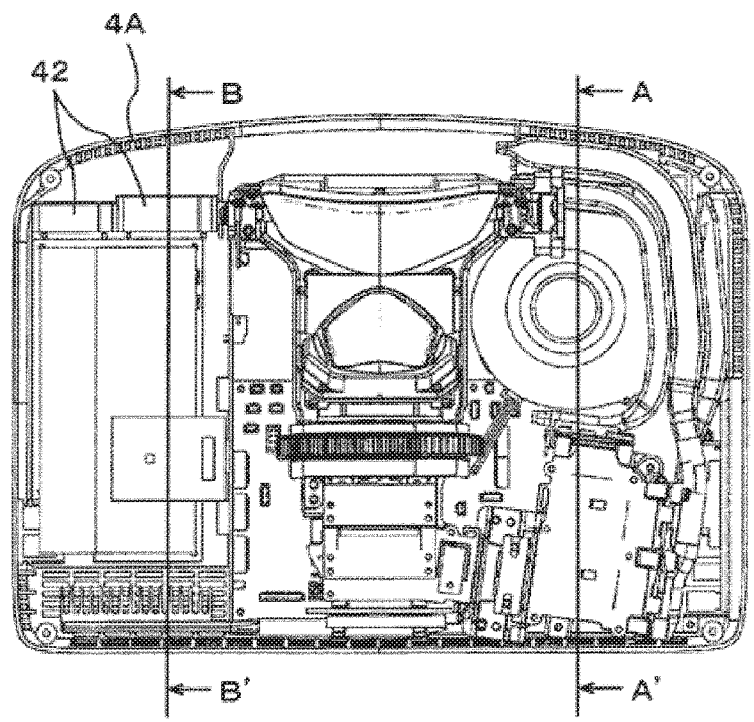
FIG. 5 is a top view showing a detailed structure of the casing inner part of the projection-type image display device in a state where the upper casing is removed.

FIGS. 4 and 5 are all top views showing the inner structure of the projection-type image display device in a state where the upper casing 2 is removed. In these drawings, the optical system including the reflection mirror 31 or the projection-type lens system 102 is disposed at the center portion of the device along a center axis (a center axis perpendicular to the drawing) along which the center of the projected light travels at the center of the top view showing the appearance of the lower casing 1, that is, the device. A power source unit 61 is disposed at one side (the left side of the drawing) from the projection-type lens system 102 and a plurality of (in this example, two) axial fans 42 are disposed adjacently at one end side of the power source unit 61. Then, the sirocco fan 41 is disposed at the other side (the right side of the drawing) from the projection-type lens system 102.

A part of a casing of the sirocco fan 41 is substantially integrated with a cooling fin. Here, heat generated by a green (G) light emission LED 75G of an LED illumination unit 71 is transmitted to the cooling fin through a heat pipe 73G, heat generated by a red (R) light emission LED 75R is transmitted to the cooling fin through a heat pipe 73R, and heat generated by a blue (B) light emission LED 75B is transmitted to the cooling fin through a heat pipe 73B. Then, the heat is cooled by cooling air generated by the sirocco fan 41 and is radiated from the exhaust port 4C.

The LED illumination unit 71 and the like constituting the above-described light source are disposed along an air stream generated by the sirocco fan 41. In other words, theses components are disposed to be bilaterally symmetrical to one another with respect to the projection-type lens system 102. Further, Reference Sign 72 of the drawing indicates a heat sink for cooling a DLP device and Reference Sign 4S indicates intake ports formed at the bottom and side faces of the lower casing 1.

Further, three heat pipes 73 are shown in these drawings and these heat pipes 73 transmit the heat of the LED illumination unit 71 to the vicinity of the exhaust port. Accordingly, the heat is efficiently radiated. More specifically, the heat is transmitted from the green (G) light emission LED 75G of the LED illumination unit 71 to the vicinity of the exhaust port 4C through the heat pipe 73G, the heat is transmitted from the red (R) light emission LED 75R to the vicinity of the exhaust port 4C through the heat pipe 73R, and the heat is transmitted from the blue (B) light emission LED 75B to the vicinity of the exhaust port 4C through the heat pipe 73B. Accordingly, the heat is radiated through the cooling fin by the cooling air generated from the sirocco fan 41 and is discharged from the exhaust port 4C to the outside of the casing.

Figure 6:
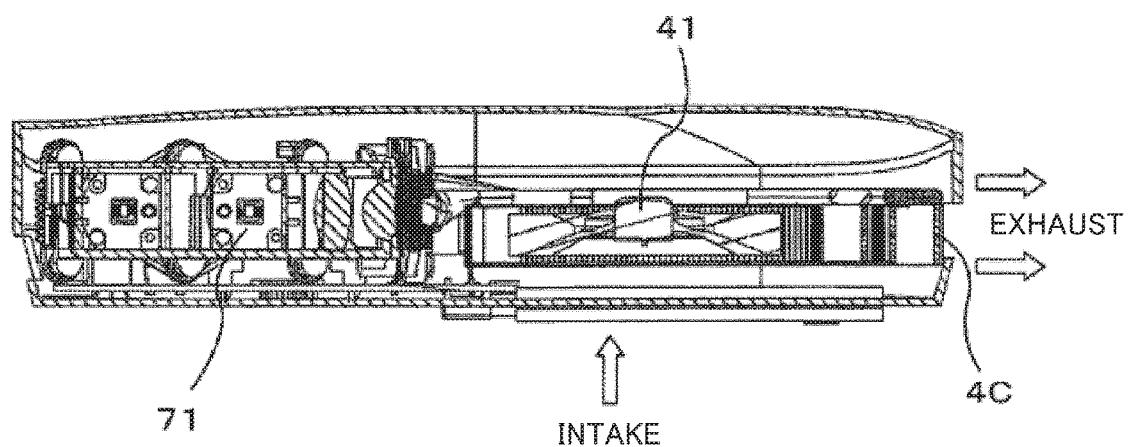
FIG. 6 is a cross-sectional view showing a cooling structure of the casing inner part of the projection-type image display device when taken along a line A-A' of FIG. 5.
Figure 7:
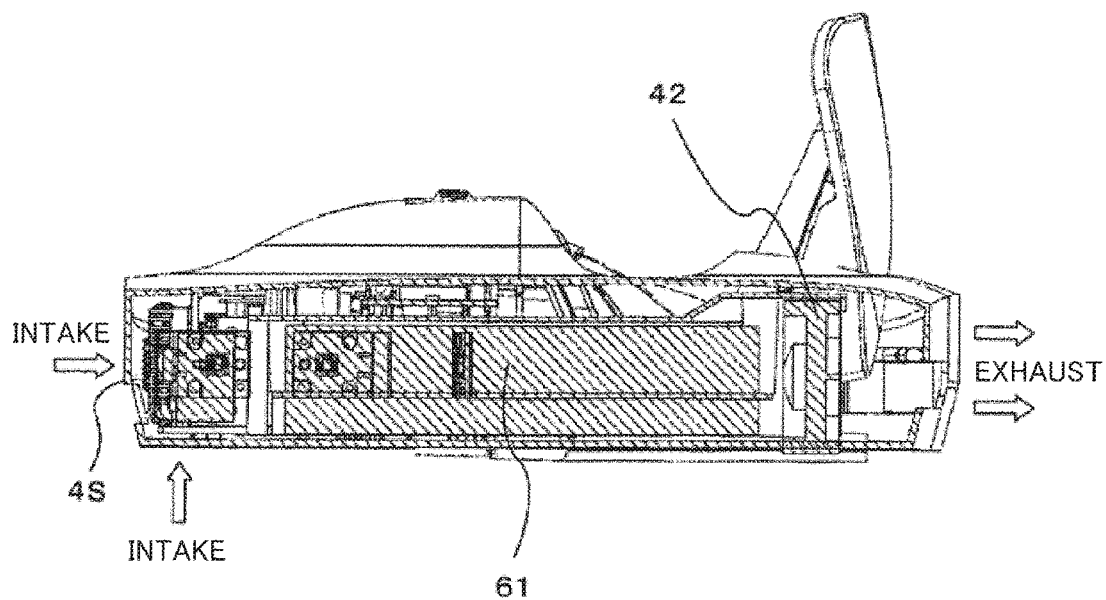
FIG. 7 is a cross-sectional view showing the cooling structure of the casing inner part of the projection-type image display device when taken along a line B-B' of FIG. 5.

Further, a detailed description of the cooling structures will be made with reference to FIGS. 6 to 8. FIG. 6 is a cross-sectional view taken along a line A-A' in a state where the mirror cover 3 of the projection-type image display device shown in FIG. 5 is closed and FIG. 7 is a cross-sectional view taken along a line B-B' in a state where the mirror cover 3 of the projection-type image display device shown in FIG. 5 is opened.

First, FIG. 6 shows a cooling structure of the LED illumination unit 71. Here, the sirocco fan 41 mounted therein suctions air from the outside through an intake port (not shown) formed at the bottom face of the lower casing 1 and discharges the air of the sirocco fan from the exhaust port 4C formed at a front face (in the drawing, a right face) of the device.

Figure 8:
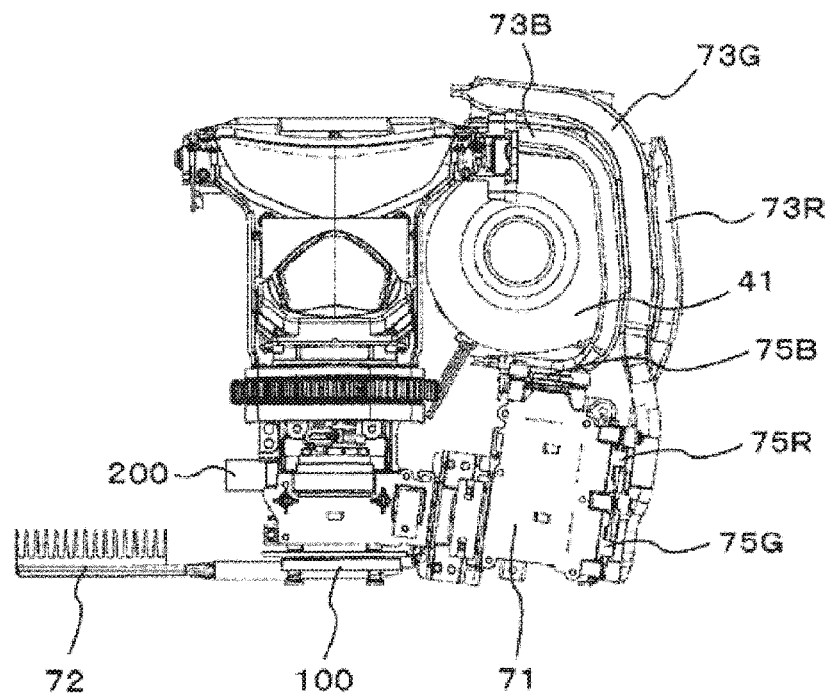
FIG. 8 is a partially enlarged view showing a cooling structure of an LED illumination unit of the projection-type image display device.

At that time, as shown in FIGS. 4, 5, and 8, the heat generated from three LEDs (semiconductor lasers) 75R, 75G, and 75B corresponding to main heat generation sources in the LED illumination unit 71 is transmitted to the exhaust ports 4C (see FIG. 7) formed at the front and side faces of the lower casing 1 through the heat pipes 73R, 73G, and 73B. Specifically, one end of the heat pipe is attached to a surface of the LED to transmit heat and the other end thereof is disposed in the vicinity of the exhaust port. Here, three LEDs 75R, 75G, and 75B are efficiently cooled when heat is transmitted to the air suctioned from the outside (for the purpose of a heat exchange).

That is, the above-described cooling structure is suitable for cooling a component in which heat is locally generated at a part (that is, three LEDs 75R, 75G, and 75B) particularly as in the LED illumination unit 71. More specifically, since the heat generation amounts of three LEDs 75R, 75G, and 75B are different from one another, the heat pipes 73R, 73G, and 73B used therein are disposed at different positions in accordance with the number of the heat pipes adjacent to the exhaust port 4C (a heat exchange amount). Further, a more efficient heat radiation effect can be attained when the number of the heat pipes 73 is appropriately set in response to the heat generation amount of the LED. In addition, Reference Sign 200 of FIG. 8 indicates a posture sensor to be described later.

Next, the inventors have examined an input current and a generated luminous flux amount in three kinds of solid-state light sources, that is, the LEDs 75R, 75G, and 75B serving as the solid-state light emitting device of the projection-type image display device. The result is indicated by the graph of FIG. 9.

Figure 9:
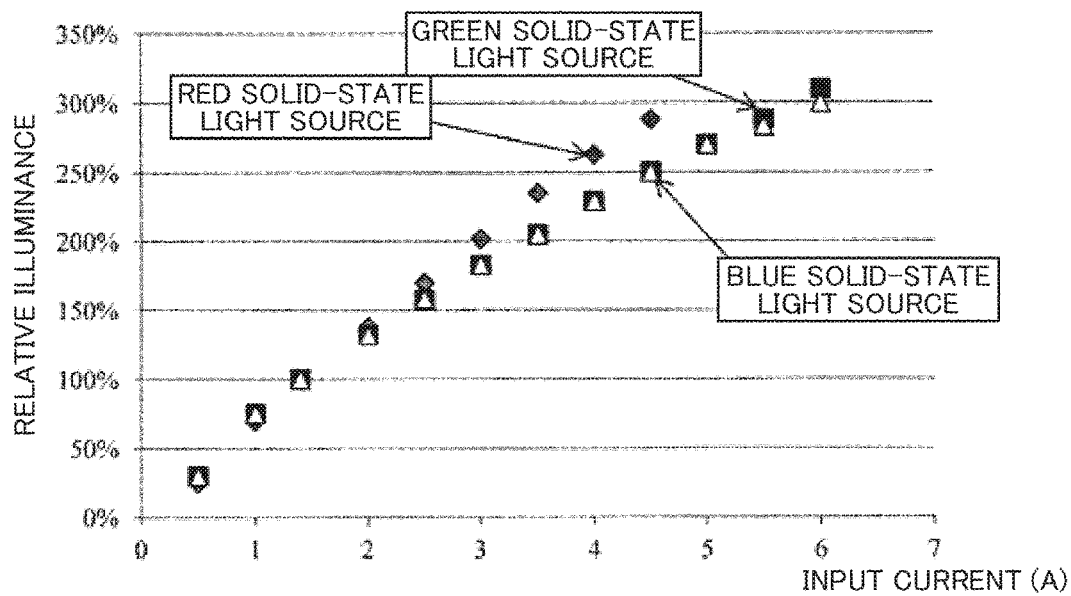
FIG. 9 is a diagram showing a relation between an input current and a generated luminous flux amount for three kinds of solid-state light sources of the projection-type image display device.

That is, as obvious from the graph of FIG. 9, the red (R) solid-state light source has satisfactory linearity in output of the light generated by the input power in a broad range (for example, 0 to 5 A). Meanwhile, the green (G) solid-state light source and the blue (B) solid-state light source deteriorate the light emission efficiency due to an increase in temperature of the light source from the vicinity in which the input power exceeds 3 A.

For this reason, when the input power exceeds 3 A, a balance among the red (R), the green (G), and the blue (B) is collapsed. Accordingly, there is concern that satisfactory color characteristics cannot be obtained.

Further, three kinds of solid-state light sources, that is, the LEDs 75R, 75G, and 75B respectively have different characteristics for a junction temperature and an illuminance (an absolute value). Results obtained by examining the solid-state light sources are indicated by the graphs of FIGS. 10 to 12.

Figure 10:
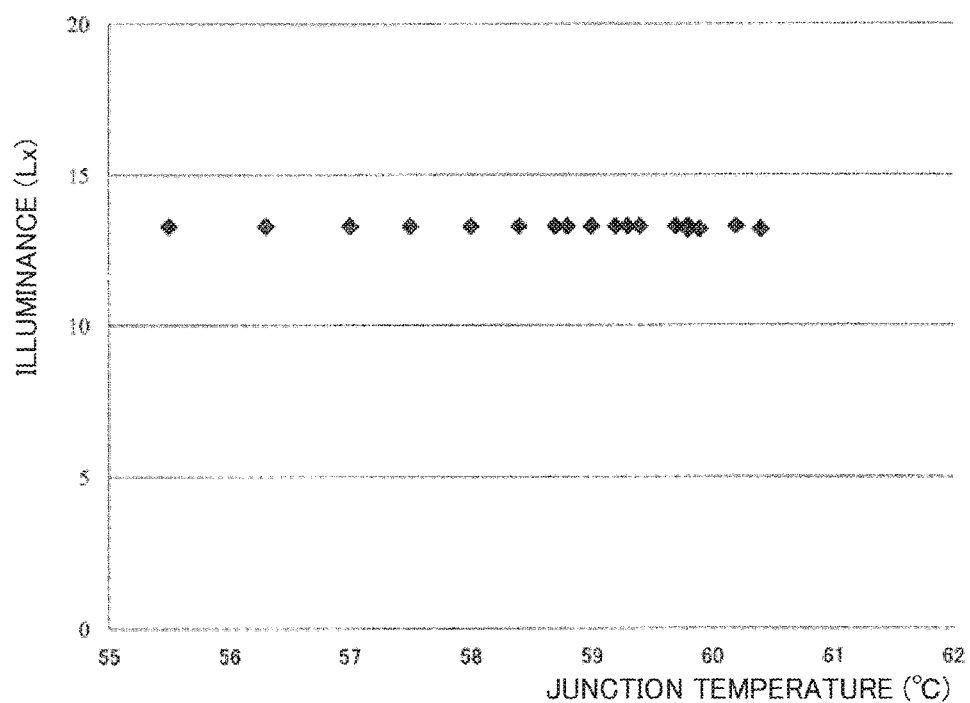
FIG. 10 is a diagram showing a junction temperature and an illuminance (an absolute value) of a blue (B) solid-state light source.
Figure 11:
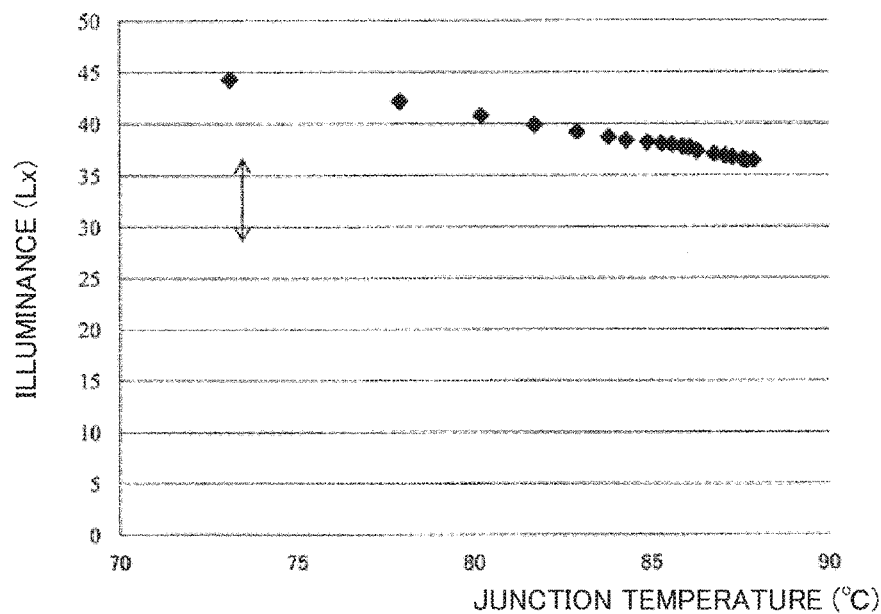
FIG. 11 is a diagram showing a junction temperature and an illuminance (an absolute value) of a red (R) solid-state light source.
Figure 12:
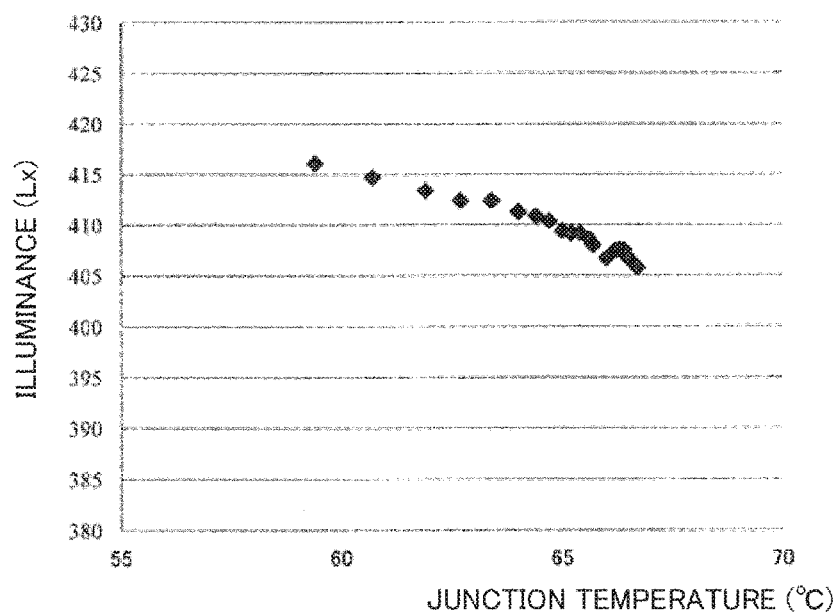
FIG. 12 is a diagram showing a junction temperature and an illuminance (an absolute value) of a green (G) solid-state light source.

FIG. 10 shows a junction temperature and an illuminance (an absolute value) of the blue (B) solid-state light source, FIG. 11 shows a junction temperature and an illuminance (an absolute value) of the red (R) solid-state light source, and FIG. 12 shows a junction temperature and an illuminance (an absolute value) of the green (G) solid-state light source. From these results, it is found that a light emission efficiency change rate for a change in junction temperature decreases in order from the red (R) solid-state light source having the largest change rate of about 20%, the green (G) solid-state light source having a change rate of about 2.5%, and the blue (B) solid-state light source having a change rate of about 0%. Accordingly, it is desirable that the cooling efficiency of the red (R) solid-state light source is larger than the cooling efficiencies of the other solid-state light sources in order to keep satisfactory color characteristics and durability.

Additionally, according to various experiments of the inventors, the performances of the heat pipes 73R, 73G, and 73B guiding the heats of the LEDs (the semiconductor lasers) 75R, 75G, and 75B to the outside are changed due to the influence of gravity. That is, it is found that the performances are changed depending on the installation state of the projection-type image display device. For example, the installation state corresponds to a lateral (horizontal) installation state, a vertical (perpendicular) installation state, an inclination (oblique) installation state, or a vertically reversed installation state (for example, a ceiling attachment state or a ceiling suspension state).

The invention is based on various kinds of knowledge obtained by the inventors and the knowledge will be described in detail below.

<Linearity Matching Control>

As described above, the light output for the input power becomes different in accordance with the characteristics of the red (R) solid-state light source and the characteristics of the green (G) solid-state light source and the blue (B) solid-state light source.

Figure 13:
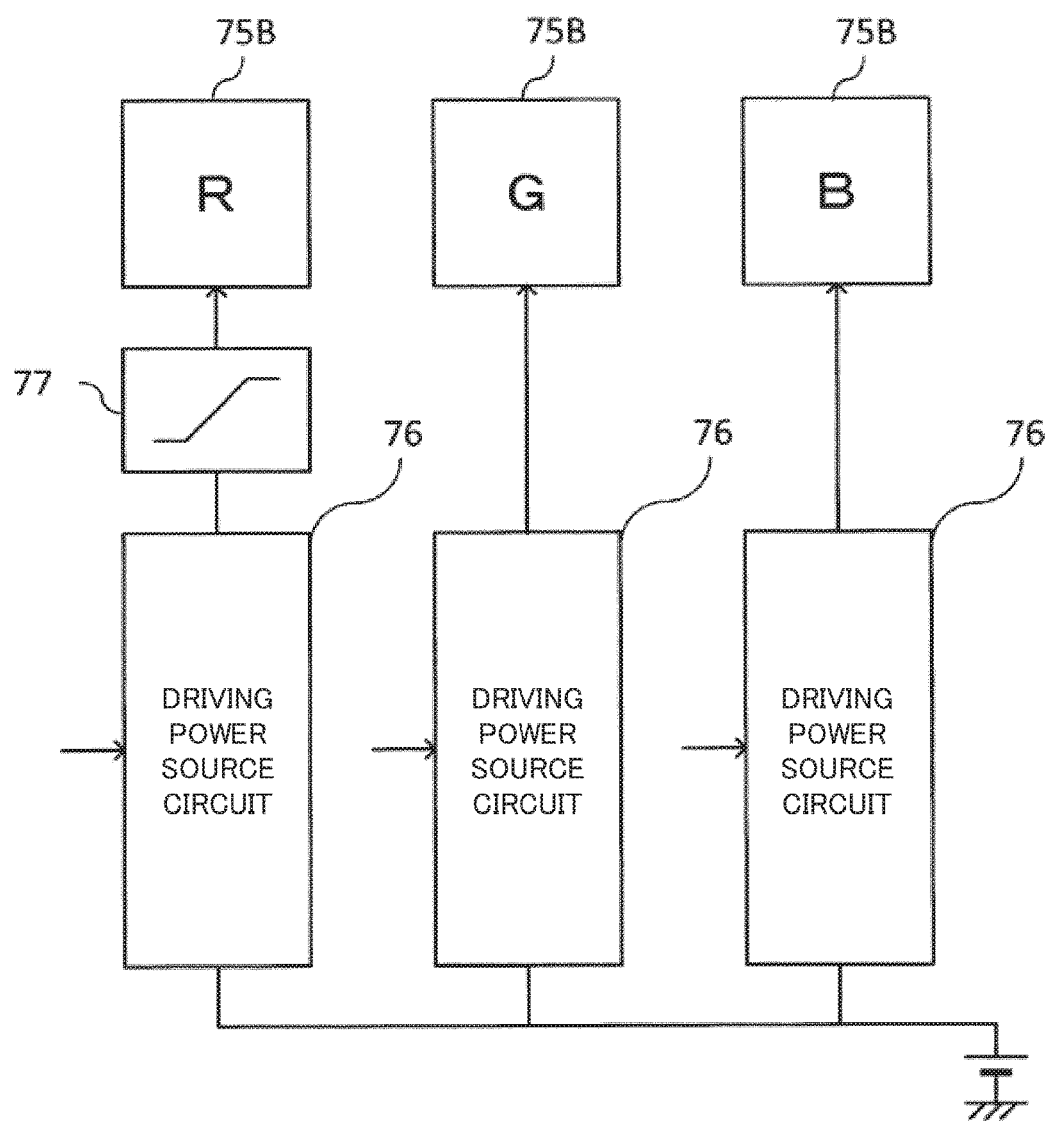
FIG. 13 is a block diagram showing an example of a circuit configuration for controlling input currents of the red (R), green (G), and blue (B) solid-state light sources.

Here, the characteristics of the red (R) solid-state light source and the characteristics of the green (G) solid-state light source and the blue (B) solid-state light source are measured in advance to create, for example, a table (a conversion table) or the like. Based on the table, the input power of the red (R) solid-state light source, the green (G) solid-state light source, and the blue (B) solid-state light source is controlled. In fact, as described above, the green (G) solid-state light source and the blue (B) solid-state light source have the substantially same characteristics, but these characteristics are largely different from the characteristics of the red (R) solid-state light source. For this reason, for example, as shown in FIG. 13, it is desirable to correct (adjust) the power output from a driving power circuit 76 through a conversion circuit 77 obtained based on the table so that the characteristics of the red (R) solid-state light source match the characteristics of the green (G) solid-state light source and the blue (B) solid-state light source.

<Light Emission Efficiency Change Rate for Change in Junction Temperature>

The characteristics are most outstanding in the red (R) solid-state light source as described above. For that reason, there is a need to efficiently cool particularly the junction temperature of the red (R) solid-state light source among three kinds of solid-state light sources.

Figure 14:
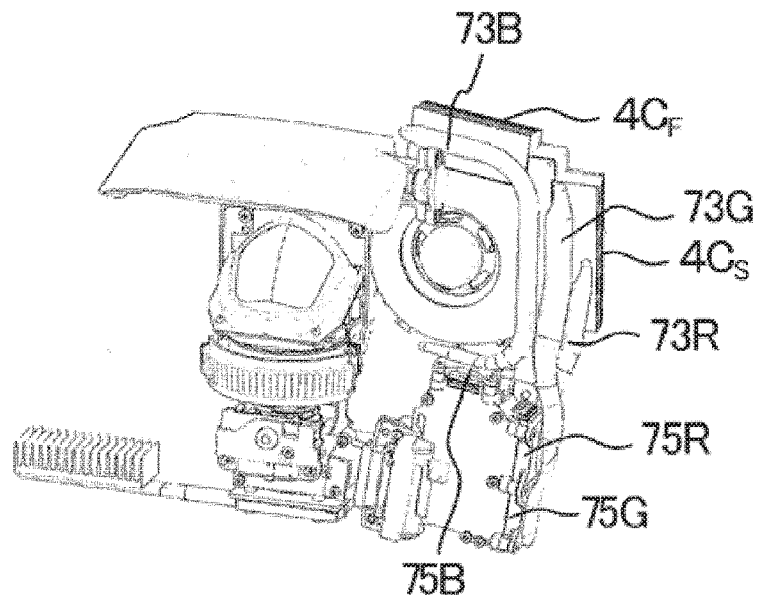
FIG. 14 is a diagram showing a configuration of a heat pipe of the red (R), green (G), and blue (B) solid-state light sources.

Here, as an example, as shown in FIG. 14, the cooling ability (the pipe diameter) of the heat pipe 73R for the red (R) solid-state light source among the heat pipes 73R, 73G, and 73B is set to be largest. Then, a method of improving the cooling ability is supposed in such a manner that a dedicated side-face heat sink $4C_S$ is attached to the end of the heat pipe 73R, a common front-face heat sink $4C_F$ is attached to the ends of the heat pipes 73G and 73B of the green (G) solid-state light source 75G and the blue (B) solid-state light source 75B, and the dedicated side-face heat sink $4C_S$ has a larger heat radiation area.

Figure 15:
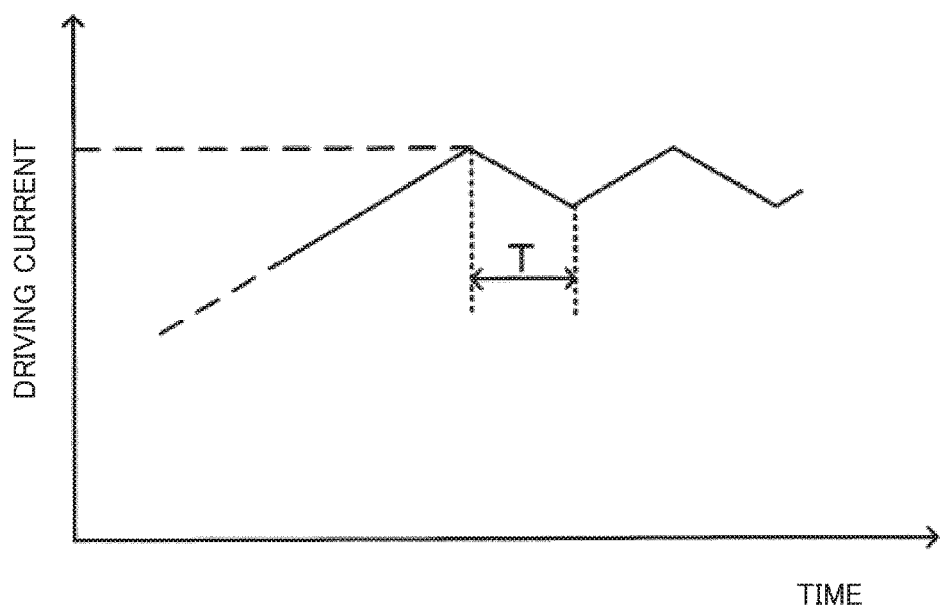
FIG. 15 is a waveform diagram showing an example of a control of a driving current input to the red (R) solid-state light source having the largest light emission efficiency change rate for a change in junction temperature.

Alternatively, as another example, as shown in FIG. 15, a method is supposed in which a limited value (for example, 3 A) is set for the driving current input to the red (R) solid-state light source, the driving current is gradually decreased when the driving current exceeds the limited value, and the driving current is increased again after a predetermined time T of 10 minutes or so elapses. Accordingly, since the junction temperature of the red (R) solid-state light source having the largest light emission efficiency change rate for a change in junction temperature can be kept to a predetermined value while not being increased to an excessively large value, the durability of the entire solid-state light source can be further increased.

Further, a configuration is desirable in which a posture sensor 200 is attached to a part of the projection-type image display device in consideration of a change in performance of the heat pipes 73R, 73G, and 73B due to an influence of gravity in accordance with the installation state (that is, the horizontal installation state, the perpendicular installation state, the oblique installation state, or the vertically reversed installation state) of the projection-type image display device and the input power of the red (R) solid-state light source, the green (G) solid-state light source, and the blue (B) solid-state light source is controlled on the basis of a detection output (for example, the horizontal installation state, the perpendicular installation state, the horizontal leftward inclined installation state, the horizontal rightward inclined installation state, the perpendicular leftward inclined installation state, the perpendicular rightward inclined installation state, or the vertically reversed state) from the posture sensor 200 (see FIG. 8).

Figures 16, 17:
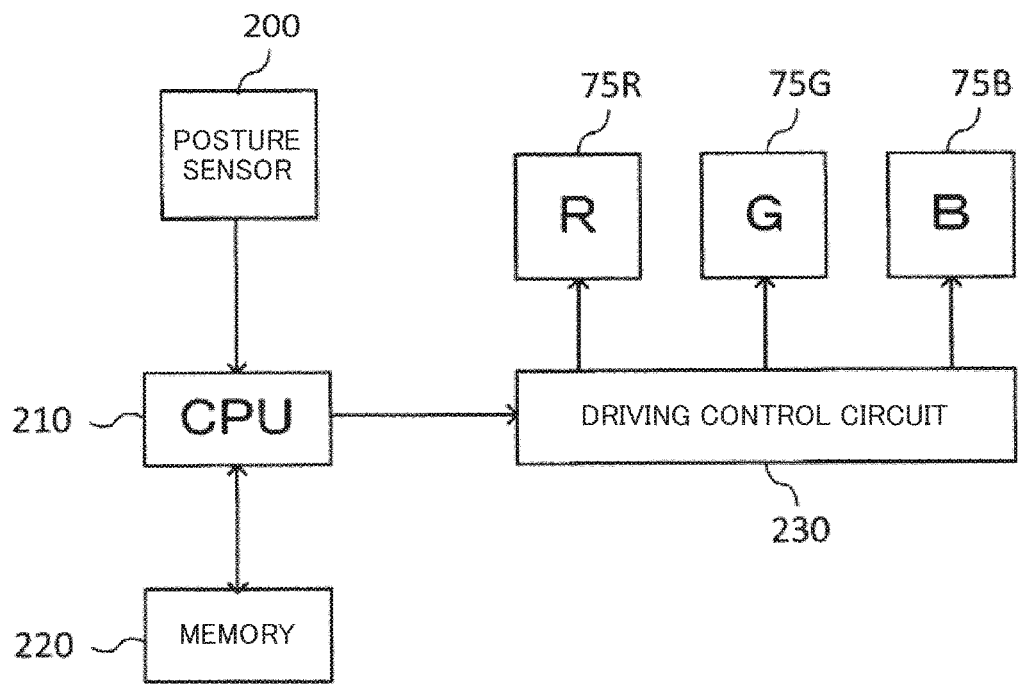
FIG. 16 is a block diagram showing an example of a control of a driving current to a solid-state light source when a posture sensor detecting an installation state of the projection-type image display device is provided.
FIG. 17 is a diagram showing an example of a table inside a memory of the block diagram of FIG. 16.

In this case, for example, as shown in FIG. 16, a configuration may be employed in which the detection output from the posture sensor 200 is taken into a central processing unit (CPU) 210 provided in a control unit controlling components of the device, is compared with the table showing a ratio between an installation state and an RGB output and stored in advance in a memory 220, and the input power of the red (R) solid-state light source, the green (G) solid-state light source, and the blue (B) solid-state light source is controlled through the driving control circuit 230 on the basis of the corresponding ratio. For example, such an operation is realized in such a manner that software stored in advance inside the memory 220 is executed by the central processing unit (CPU) 210.

In addition, an example of the table showing the ratio of the RGB output is shown in FIG. 17. That is, the projection-type image display devices are disposed in various installation states in advance and the input power (the ratio) of the red (R) solid-state light source, the green (G) solid-state light source, and the blue (B) solid-state light source is set as a table inside the memory 220 on the basis of a white balance in those states. During the operation of the device, the central processing unit (CPU) 210 receives a detection signal from the posture sensor 200, determines a corresponding installation state, and controls the input power of the red (R) solid-state light source, the green (G) solid-state light source, and the blue (B) solid-state light source in accordance with the ratio of the corresponding RGB output. Accordingly, it is possible to obtain excellent light emission characteristics regardless of the installation state of the projection-type image display device.

Additionally, the invention is not limited to the above-described embodiments and includes various modified examples. For example, an entire system has been described in detail in the above-described embodiments in order to easily describe the invention, but the invention is not limited to a configuration essentially including all configurations described above. Further, a part of a configuration of a certain embodiment can be replaced by configurations of the other embodiments and configurations of the other embodiments can be added to a configuration of a certain embodiment. Additions, omissions, and replacements of a part of the configurations of the embodiments can be made.

Further, the above-described configurations, functions, processing units, and processing means may be realized by hardware in such a manner that a part or the entirety thereof is designed as, for example, an integrated circuit. The above-described configurations and functions may be realized by software in such a manner that a processor analyzes and executes a program realizing each function. Information on programs, tables, and files for realizing the functions can be stored in a storage device such as a memory, a hard disk, an SSD (Solid State Drive) or a storage medium such as an IC card, an SD card, and a DVD.

REFERENCE SIGNS LIST 75R, 75G, 75B: Solid-state light source (LED)
73R, 73G, 73B: Heat pipe
77: Conversion circuit
4CS, 4CF: Heat sink
200: Posture sensor
210: Central processing unit (CPU)
220: Memory
230: Driving control circuit

The invention claimed is:

1. A projection-type image display device comprising:
a light source unit that irradiates video light to be magnified and projected onto a reflection mirror;
a video processing unit, coupled to a memory, that generates the video light to be magnified and projected on the basis of an external electrical signal and light irradiated from the light source unit;
a projection-type optical system that magnifies and projects the video light output from the video processing unit; and
a posture sensor that is attached to a part of the projection-type image display device to detect an installation state thereof,
wherein the memory stores a table that sets a relation between the installation state and a ratio of driving power input of each a red (R) solid-state light source, a green (G) solid-state light source, and a blue (B) solid-state light source,
wherein the light source unit includes at least the red solid-state light source, the green solid-state light source, and the blue solid-state light source, each of which is configured as a solid-state light emitting device,
wherein driving power input to each of the red solid-state light source, the green solid-state light source, and the blue solid-state light source is controlled on the basis of light emission characteristics and the ratio of driving power input in relation to the installation state set in the table according to the installation state that is detected by the posture sensor,
wherein the projection-type optical system is disposed at a center portion of a casing of the projection-type image display device, a power source unit is disposed at one side from the projection-type optical system and the light source unit is disposed at another side from the projection-type optical system, and wherein a cooling member is respectively provided at each of the red solid-state light source, the green solid-state light source, and the blue solid state light source and a cooling ability of the cooling member provided at the red solid-state light source is set to be larger than the cooling ability of each of the cooling members provided at the green solid-state light source and the blue solid-state light source, respectively, and wherein each cooling member is a heat pipe and a diameter of the heat pipe provided at the red solid-state light source is larger than the diameter of the heat pipe provided at each of the green solid-state light source and the blue solid-state light source, respectively.

2. The projection-type image display device according to claim 1, wherein the cooling members further include a first heat sink attached to an end of the heat pipe provided at the red solid-state light source and a second heat sink attached to ends of the heat pipes provided at the green solid-state light source and the blue solid-state light source.

3. The projection-type image display device according to claim 1, wherein driving power input to the red solid-state light source is adjusted so that light emission characteristics of the red solid-state light source match light emission characteristics of the green solid-state light source and the blue solid-state light source.

4. The projection-type image display device according to claim 1, wherein, when driving power input to the red solid-state light source reaches a predetermined value, a control of increasing the driving power after decreasing the driving power for a predetermined time is repeated.

5. A projection-type image display device comprising:

a light source unit that irradiates video light to be magnified and projected onto a reflection mirror;

a video processing unit, coupled to a memory, that generates the video light to be magnified and projected on the basis of an external electrical signal and light irradiated from the light source unit;

a projection-type optical system that magnifies and projects the video light output from the video processing unit; and a posture sensor that is attached to a part of the projection-type image display device to detect an installation state thereof, wherein the memory stores a table that sets a relation between the installation state and a ratio of driving power input of each a red (R) solid-state light source, a green (G) solid-state light source, and a blue (B) solid-state light source, wherein the light source unit includes at least the red solid-state light source, the green solid-state light source, and the blue solid-state light source, each of which is configured as a solid-state light emitting device, wherein driving power input to each of the red solid-state light source, the green solid-state light source, and the blue solid-state light source is controlled on the basis of the ratio of driving power input in relation to the installation state set in the table according to the installation state that is detected by the posture sensor, wherein the projection-type optical system is disposed at a center portion of a casing of the projection-type image display device, a power source unit is disposed at one side from the projection-type optical system and the light source unit is disposed at another side from the projection-type optical system, wherein a cooling member is respectively provided at each of the red solid-state light source, the green solid-state light source, and the blue solid-state light source and a cooling ability of the cooling member provided at the red solid-state light source is set to be larger than the cooling ability of each of the cooling members provided at the green solid-state light source and the blue solid-state light sources, respectively, and wherein a plurality of heat pipes are provided as cooling members at each of the red solid-state light source, the green solid-state light source, and the blue solid-state light source, and a diameter of the heat pipe provided at the red solid-state light source is set to be larger than diameters of the heat pipes provided at the green solid-state light source and the blue solid-state light source.

6. The projection-type image display device according to claim 5, wherein the cooling members further include a first heat sink attached to an end of the heat pipe provided at the red solid-state light source and a second heat sink attached to ends of the heat pipes provided at the green solid-state light solid state source and the blue solid state source.

7. The projection-type image display device according to claim 5, wherein driving power input to the red solid-state light source is adjusted so that light emission characteristics of the red solid-state light source match light emission characteristics of the green solid-state light source and the blue solid-state light source.

* * * * *